US006266327B1

(12) United States Patent
Hernandez-Valencia

(10) Patent No.: US 6,266,327 B1
(45) Date of Patent: Jul. 24, 2001

(54) NON-CONFORMANCE INDICATOR FOR THE GUARANTEED FRAME RATE SERVICE

(75) Inventor: Enrique Hernandez-Valencia, Highlands, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/045,351

(22) Filed: Mar. 20, 1998

(51) Int. Cl.[7] .................................................. G01R 31/08
(52) U.S. Cl. ............................................. 370/252; 370/230
(58) Field of Search ................................... 370/252, 241, 370/253, 335, 337, 395, 230–236, 248, 396, 493, 498, 472, 535, 389

(56) References Cited

U.S. PATENT DOCUMENTS

| 5,406,550 | * | 4/1995 | McTiffin | 370/335 |
| 5,666,353 | * | 9/1997 | Klausmeier et al. | 370/230 |
| 5,926,476 | * | 7/1999 | Ghaibeh | 370/395 |
| 6,049,530 | * | 4/2000 | Petersen et al. | 370/248 |

OTHER PUBLICATIONS

Fabrice Guillemin et al., "Cell conformance testing with respect to the peak cell rate in ATM networks" Computer Networks and ISDN Systems, vol. 27, Issue: 5, pp. 703–725, Mar. 1995.*

The ATM Forum Technical Committee, Traffic Management Specification, Version 4.0, Apr. 1996.*

Rohit Goyal et al., "Simulation Experiments with Guaranteed Frame Rate for TCP/IP Traffic", ATM Forum, pp. 1–12, Jul. 1997.*

* cited by examiner

Primary Examiner—Wellington Chin
Assistant Examiner—Prenell Jones
(74) Attorney, Agent, or Firm—Joseph J. Opalach

(57) ABSTRACT

An ATM network element receives a stream of data associated with a particular user. This data stream is further partitioned into frames and ATM cells. A predefined traffic set is associated with the user. The ATM network element evaluates the received data stream for conformance to the user's traffic set at every frame boundary. The Payload Type Indicator (PTI) of an ATM cell header is used to indicate whether that cell belongs to a non-conforming frame or a conforming frame. In particular, if a frame is determined to be non-conforming, the ATM network element sets the PTI field of at least the end-of-frame cell (i.e., the cell with the UUI bit set to one in AAL5), to a predefined code representative of non-conforming (hereafter referred to as an NCF code). As a result, downstream network elements are able to determine which of the currently buffered cells belong to a non-conforming frame by looking at both the PTI field and the frame boundary marker (UUI bit). For instance, if a downstream network element determines that the end-of-frame cell belongs to a non-conforming frame, any of the cells from that frame may be discarded from a buffer irrespective of the PTI field status of the other user data cells for that frame.

16 Claims, 8 Drawing Sheets

CLP SIGNIFICANT GFR SERVICE UNDER A VIRTUAL SCHEDULER FRAMEWORK WITH NO CELL TAGGING ALLOWED (GFR1)

CLP TRANSPARENT GFR SERVICE UNDER A VIRTUAL SCHEDULER FRAMEWORK (GFR0)

CLP SIGNIFICANT GFR SERVICE UNDER A VIRTUAL SCHEDULER FRAMEWORK WITH NO CELL TAGGING ALLOWED (GFR1)

CLP SIGNIFICANT GFR SERVICE UNDER A VIRTUAL SCHEDULER FRAMEWORK WITH CELL TAGGING ALLOWED (GFR2)

CLP TRANSPARENT GFR SERVICE UNDER A CONTINUOUS-STATE LEAKY BUCKET FRAMEWORK (GFR0)

CLP SIGNIFICANT GFR SERVICE UNDER A CONTINUOUS-STATE LEAKY BUCKET FRAMEWORK WITH NO CELL TAGGING ALLOWED (GFR1)

CLP SIGNIFICANT GFR SERVICE UNDER A CONTINUOUS-STATE LEAKY BUCKET FRAMEWORK WITH CELL TAGGING ALLOWED (GFR2)

NON-CONFORMANCE INDICATOR FOR THE GUARANTEED FRAME RATE SERVICE

CROSS-REFERENCE TO RELATED APPLICATIONS

Related subject matter is disclosed in the co-pending, commonly assigned, U.S. Patent application of Hernandez-Valencia, entitled "Conformance Definitions for Guaranteed Frame Rate Service," Ser. No. 09/045,350, filed on even data herewith.

FIELD OF THE INVENTION

This invention relates generally to communications and, more particularly, to a packet communications system.

BACKGROUND OF THE INVENTION

Existing ATM (Asynchronous Transfer Mode) services are mainly geared towards native cell-based applications, at least in regard to their Quality of Service (QoS) commitments. In contrast, the Guaranteed Frame Rate service (GFR) is a new proposed Service Category in the ATM Forum, or ATM Transfer Capability (ATC) in ITUT-T, that is a specialize call transport mechanism for packet-based or frame-based applications (e.g., se ITU-T Recommendation I.371 Living List: Perth, Australia, Rapporteur Meeting, 1998). Generally speaking, the GFR service is expected to deliver a minimum bandwidth guarantee to a user with respect to the user's frame traffic that conforms to a set of predefined conditions (also referred to herein as a traffic set, or traffic descriptors). (This minimum bandwidth guarantee, typically expressed in terms of a low cell loss, is also referred to herein as one example of a GFR QoS commitment). The minimum bandwidth guarantee can be determined at subscription time, or negotiated during call setup.

GFR is intended to support non-real time applications. Higher-layer protocol data units (PDUs) or frames, are segmented into one or more user-generated cells prior to their transmission over the standardized network interface. Multiple frames are not expected to straddle a single ATM cell, nor are cells from multiple frames expected to be interleaved unless a suitable de-multiplexing mechanism is provided (e.g., the MID (message identification) field in ATM Adaptation Layer (AAL) 3/4 or a Virtual Path Identifier (VPI)/Virtual Connection Identifier (VCI) fields in other AALs (e.g., see ITU-T Recommendation I.363.3 BISDN ATM Adaptation Layer Specification (AAL 3/4), (1996)). In addition, a mechanism to identify frame boundaries at the ATM layer is required (e.g., the User-to-User Indication (UUI) bit in AAL5). Although, theoretically, a GFR service may be implemented with any AAL providing a frame delineation mechanisms, the initial implementation of the GFR service is geared towards the use of AAL5.

As part of providing the GFR service, a conformance algorithm is used to identify that portion of the user generated traffic that meets the requirements of the above-mentioned traffic set. Illustratively, the traffic set includes a set of parameters such as (but not limited to): peak cell rate (PCR) (instantaneous cell rate); minimum cell rate (MCR) (a maximum number of cells over a period of time, T, to which a QoS commitment applies); maximum burst size (MBS) (which can be interpreted as the maximum number of cells allowed in a data burst at rate PCR); and a maximum frame size (MFS) (a maximum number of cells permitted in a frame). The conformance algorithm evaluates, in real time, a received data stream from a user against the user's predefined traffic set, where the received data stream is partitioned into frames that are further made up of ATM cells. This is shown in FIG. 1. An illustrative received data stream comprises data burst 51, occurring over a time interval T. Each data burst comprises a plurality of cells. The cells are further partitioned into frames 61 and 62 (denoted by the dashed boxes). The conformance algorithm measures the above described PCR, MCR, MBS, and MFS values for this received data stream. For example, assume that the permitted MFS value of the traffic set is equal to 6 (it should be noted that these numbers are used for illustrative purposes only). The conformance algorithm counts each received cell for frame 61. Upon reaching the seventh cell, the conformance algorithm declares frame 61 to be in non-conformance, and, as such, frame 61 does not receive the committed QoS. (It should be noted that frame 61, albeit non-conforming, may still be transmitted by the network.) In the context of frame 61, the first six cells from frame 61 are referred to conforming and the two excess cells 71 are referred to as non-conforming. However, even through frame 61 has been declared non-conforming with respect to the MFS, those six conforming cells from frame 61 are still used in determining conformance to the other traffic set parameters. In particular, the six conforming cells from frame 61 are used to determine whether data burst 51 conforms to the MBS. Illustratively, assume that the MBS is equal to a value of 10 cells. In this instance, data burst 51 is non-conforming since frame 62 comprises six cells, which when added to the six conforming cells from frame 61 exceeds the MBS requirement. As such, frame 62 is also declared as non-conforming notwithstanding the fact that frame 62 meets the MFS requirement. As such, in this conformance technique, cells from a prior non-conforming frame are also applied to the next frame for use in determining if that (future) frame can receive the committed QoS.

SUMMARY OF THE INVENTION

I have observed that the above-described GFR service conformance definitions do not intend to specify the disposition by a network of non-conforming cells or non-conforming frames to allow for vendor and service differentiation. In other words, cells from a non-conforming frame may be forwarded by the ingress network interface (e.g., edge network element (NE)) to the downstream NEs. However, the downstream NEs are not able to differentiate cells from non-conforming frames from cells in conforming frames. This aspect makes it harder for a downstream NE to fulfill its QoS commitments since these non-conforming cells are in fact in excess of the GFR traffic set and, as such, potentially consume unallocated NE resources.

Therefore, and in accordance with the invention, a frame-level conformance indication code is defined for each frame. As a result, each NE is able to determine whether a frame, and its constituent cells, are conforming or non-conforming by inspecting values of the conformance indication code.

In an embodiment of the invention, the Payload Type Indicator (PTI) of an ATM cell header is used to indicate whether that cell belongs to a non-conforming frame or a conforming frame. In particular, if a frame is determined to be non-conforming, a NE sets the PTI field, of at least the end-of-frame cell (i.e., the cell with the UUI bit set in one in AAL5), to a predefined code representative of non-conformance (hereafter referred to as an NCF code). As a result, downstream NEs are able to determine which of the currently buffered cells belong to a non-conforming frame by looking at both the PTI field and the frame boundary market (UUI bit). For instance, if a downstream NE determines that the end-of-frame cell belongs to a non-conforming frame, any of the cells from that frame may be discarded from a buffer irrespective of the PTI field status of the other user data cells for that frame. (Whether or not a subset of cells of a non-conforming frame, or all of the cells of a non-conforming frame, are discarded is a matter of local NE policy or global GFR service policy.)

DETAILED DESCRIPTION

Figure 1:
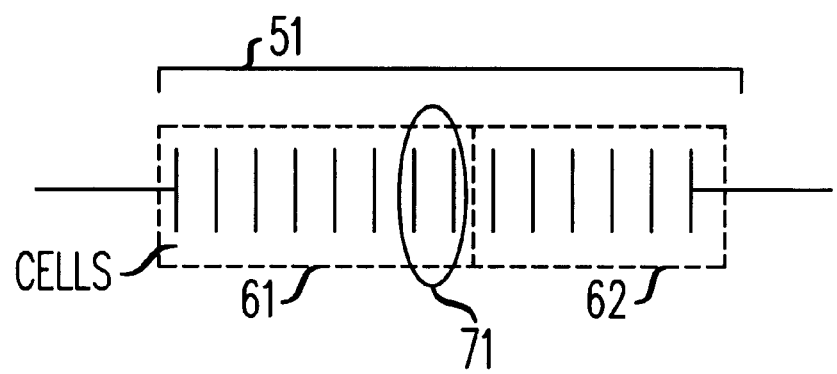
FIG. 1 shows an illustrative data stream for highlighting prior art conformance techniques.
Figure 1:
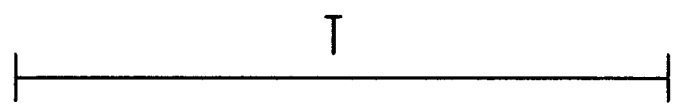

Before describing the inventive concept, some additional background information on ATM and, in particular, GFR is provided. Following this section, the conformance technique described in the above-mentioned co-pending, commonly assigned, U.S. Patent application of Hernandez-Valencia, entitled "Conformance Definitions for Guaranteed Frame Rate Service," is presented. After this section, the inventive concept is described.

The Guaranteed Frame Rate service (GFR)

As known in the art, an ATM user sends ATM cells either marked or unmarked. In particular, an ATM cell carries a single bit cell loss priority (CLP) indicator as part of the ATM cell header. An ATM cell is called marked, or unmarked, when the originator of the ATM cell has set its CLP bit set to one, or zero, respectively. A cell is called tagged when the network has set its CLP bit to one. A network may perform tagging only if tagging is allowed by the user. (Once in the network, the source of the setting of the CLP bit, i.e., whether marked by a user or tagged by a network element, cannot be determined.)

An unmarked cell identifies a cell of higher loss priority, that is, a cell with a higher QoS commitment, than a marked cell. In a GFR service, network elements are aware of the loss priority indication conveyed in the CLP bit. Hence, marked cells are assumed to identify information of lesser importance to the user. If tagging is allowed by the user, a network is permitted to tag unmarked cells as determined by respective frame marking/tagging rule specified for the service (not described).

Users of the GFR service are required to send frames either marked or unmarked. However, frame marking, itself, has a number of variations. For example, homogeneous frame marking may be used in which an unmarked frame is defined as comprising all unmarked cells and a marked frame comprises all marked cells. Unfortunately, homogeneous frame marking cannot be assumed at all standardized interfaces for various practical reasons: i) the user may have failed to mark the frame in an homogeneous fashion, ii) frame delineation between a marked and an unmarked frame may have been lost at some point of the connection, iii) when tagging is allowed, a network element may not be able to tag all the cells of a frame unless the cells are all accumulated prior to their forwarding across the standardized interface, which is not currently required in ATM equipment. Therefore, any classification of user-generated frames in terms of homogeneously marked/unmarked frames would be incomplete.

As such, there are other variations to the meaning of a marked/unmarked frame. For example, an unmarked frame comprises only unmarked cells but a marked frame is one in which there is at least one marked cell. Alternatively, the marking status of the frame may be determined by the marking status of the first cell of the frame. This alternative definition has the added value in that a) the marking status of a frame is determined at the beginning of the frame, which simplifies the implementation of network policing functions, and b) makes it easier for a network to enforce marking rules such that only unmarked cells qualify for any QoS commitments. For instance, a network may also be allowed to tag unmarked cells from inhomogeneously marked/tagged frames. This network behavior could even be allowed when tagging is not allowed by the user. Thus, it is possible to define at least two version of the GFR service, based on whether the user allows a network to tag unmarked frames.

The QoS commitment applies only to cells from unmarked frames conforming to the GFR traffic descriptor. The conformance definition, or algorithm, identifies frames from the incoming user generated cell stream that quality for the QoS commitments offered by the GFR service. There are three conformance tests that cells must pass to qualify for QoS commitments. The relevant tests are: i) maximum frame size (MFS) conformance, ii) peak cell rate (PCR) conformance, and iii) maximum burst size/minimum cell rate (MBS/MCR) conformance. Note that the maximum burst size/minimum cell rate test is in fact a single test for the two traffic parameters.

It is also possible to define a version of the GFR service that is not CLP-bit aware. In such a case, the QoS commitment applies to all user generated cells conforming to the GFR traffic descriptor that does not depend on the CLP bit.

Frame-Based Conformance Definition

Figure 2:
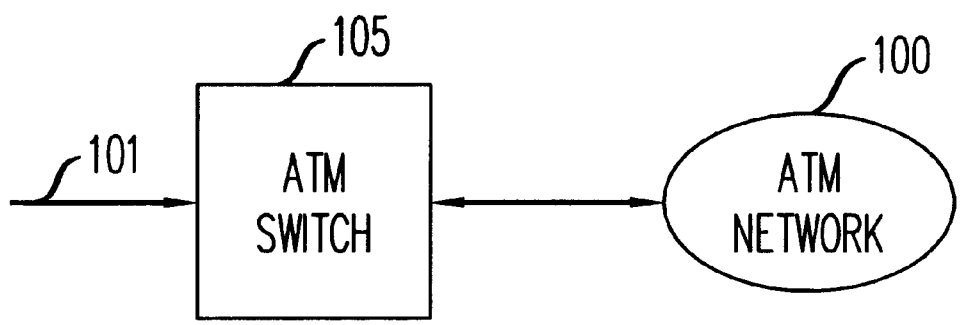
FIG. 2 shows an illustrative portion of a network providing a GFR service in accordance with the principles of the invention.

Reference should now be made to FIG. 2. Other than the inventive concept, the elements shown in FIG. 2 are well-known and will not be described in detail. For example, although shown as a single block element, ATM switch 105 includes stored-program-control processors, memory, and appropriate interface cards. In FIG. 2, an ATM network element, i.e., an ATM switch 105, receives a user data stream 101. The latter is further partitioned into frames, that are further made up of ATM cells. Although it is not necessary to the inventive concept, for the purposes of this description it is assumed that the related ATM service is in accordance with ATM Adaptation Layer (AAL) 5 as known in the art. For simplicity it is assumed that the user data stream 101 is associated with a particular user and other sources of traffic (from other users) received by ATM switch 105 are not shown. ATM switch 105 is a gateway element for transmission of data via ATM network 100, as known in the art, and provides a GFR service to the user. (Although the GFR service is still in the proposal stage, for the purposes of this description it is only important that ATM switch 105 receive a data stream representing a sequence of frames, each frame comprising a plurality of ATM cells, where the delineation of the frame utilizes the UUI bit of AAL5).

For each user, or source of the data stream, there is a predefined traffic set as known in the art. Illustratively, this traffic set includes a set of parameters such as (but not limited to): PCR, MCR, MBS, MFS, $\tau_{PCR}$, $\tau_{MCR}$. (The cell delay variation for the PCR and MCR are stored in $\tau_{PCR}$, and $\tau_{MCR}$, respectively. Also, The values for each user's traffic set are presumed to be stored within ATM switch 105.) ATM switch 105 evaluates user data stream 101 for conformance to the user's traffic set at every frame boundary (described further below). If a particular frame is non-conforming, the next (future) frame is evaluated only on the basis of the traffic characteristics of that future frame and prior conforming frames. That is, unlike the above-described prior art technique, past non-conforming user generated traffic is not used to determine any QoS commitments to future user generated traffic. As a result, such a conformance definition for a GFR service delivers a low cell loss commitment only to cells from complete frames conforming to the GFR traffic set. It is presumed that ATM switch 105 is suitably programmed to carry out the below-described methods using conventional programming techniques, which, as such, will not be described herein.

Conformance definitions are provided below for three variations of the GFR service. For the first version, to be referred to as the GFR0 service the QoS commitment is independent of the CLP bit status. For the second version, to be referred to as GFR1, the QoS commitment applies to conforming unmarked cells. No cell tagging is allowed in this service. For the third version, to be referred to as GFR2, the QoS commitment also applies to conforming unmarked cells and cell tagging is allowed. For the CLP aware versions of the service, marked cells are expected to indicate cells with lower importance to the user, and hence, qualifying for a degraded cell loss commitment, if any.

Before describing the flow charts of FIGS. 3–8, the following definitions should be noted. It is assumed frame boundaries are indicated by use of the above-mentioned User-to-User Indication (UUI) bit in AAL5. The variables $T_{PCR}$ and $T_{MCR}$ are respectively the inverse of the PCR and MCR and are calculated as known in the art. For the combined MCR/MBS test a new cell delay variation tolerance, $\tau_{MCR}$, is computed as:

$$\tau_{MCR}=(MBS-MFS-1)(T_{MCR}-T_{PCR})+\tau_{MCR}.$$

Other supplemental variables are incorporated to keep track of the state of the relevant test. These are:
- Frame Loss Priority (FLP): FLP=1 indicates a marked/tagged frame; and FLP=0 indicates an unmarked/untagged frame;
- New Frame (NeF): New frame indicator;
- Non-Conforming Frame (NCF): Non-conforming frame indicator;
- End of Frame (EOF): End of Frame indicator; and
- Cnt: the size of the current frame in cells.

Figure 5:
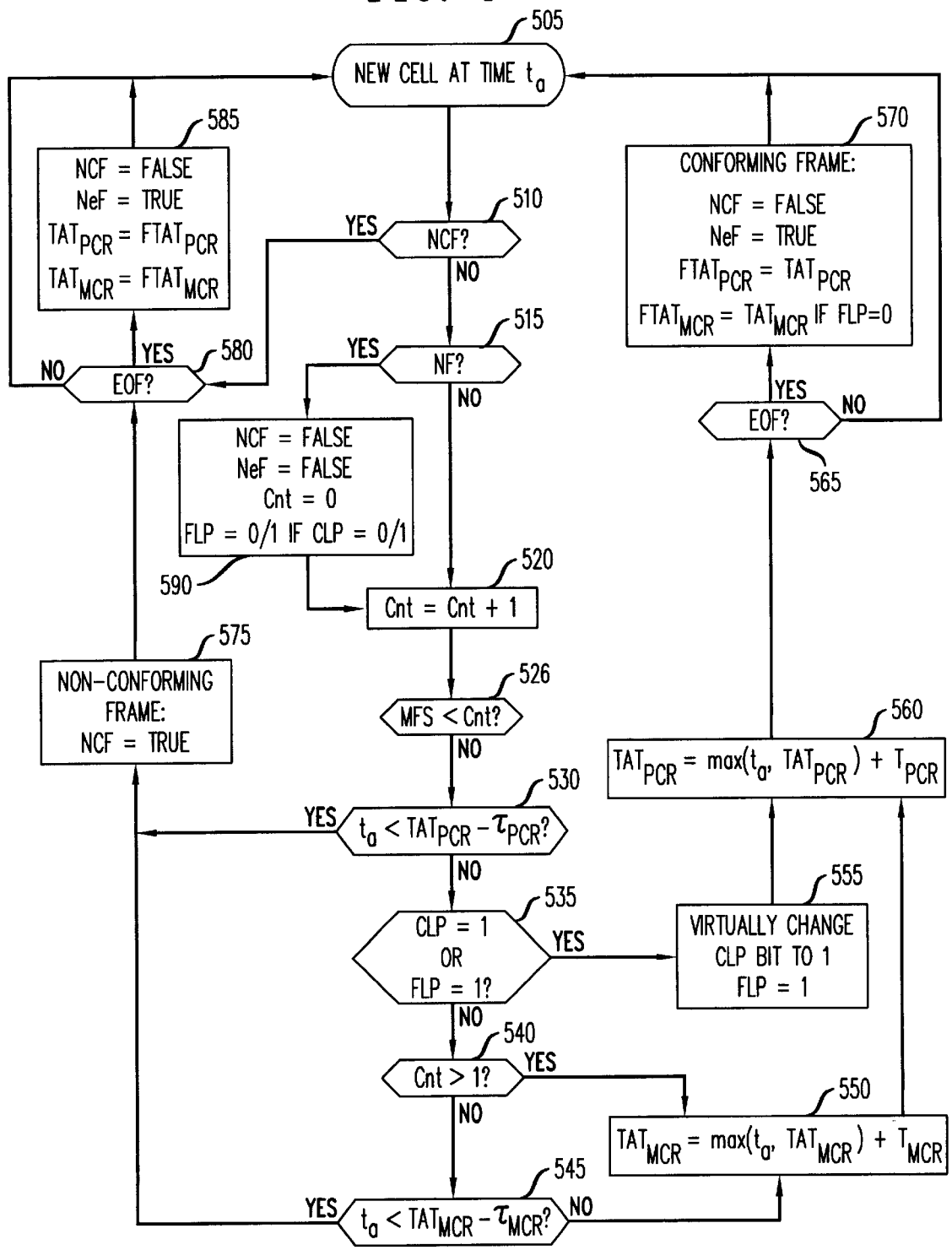
Figure 6:
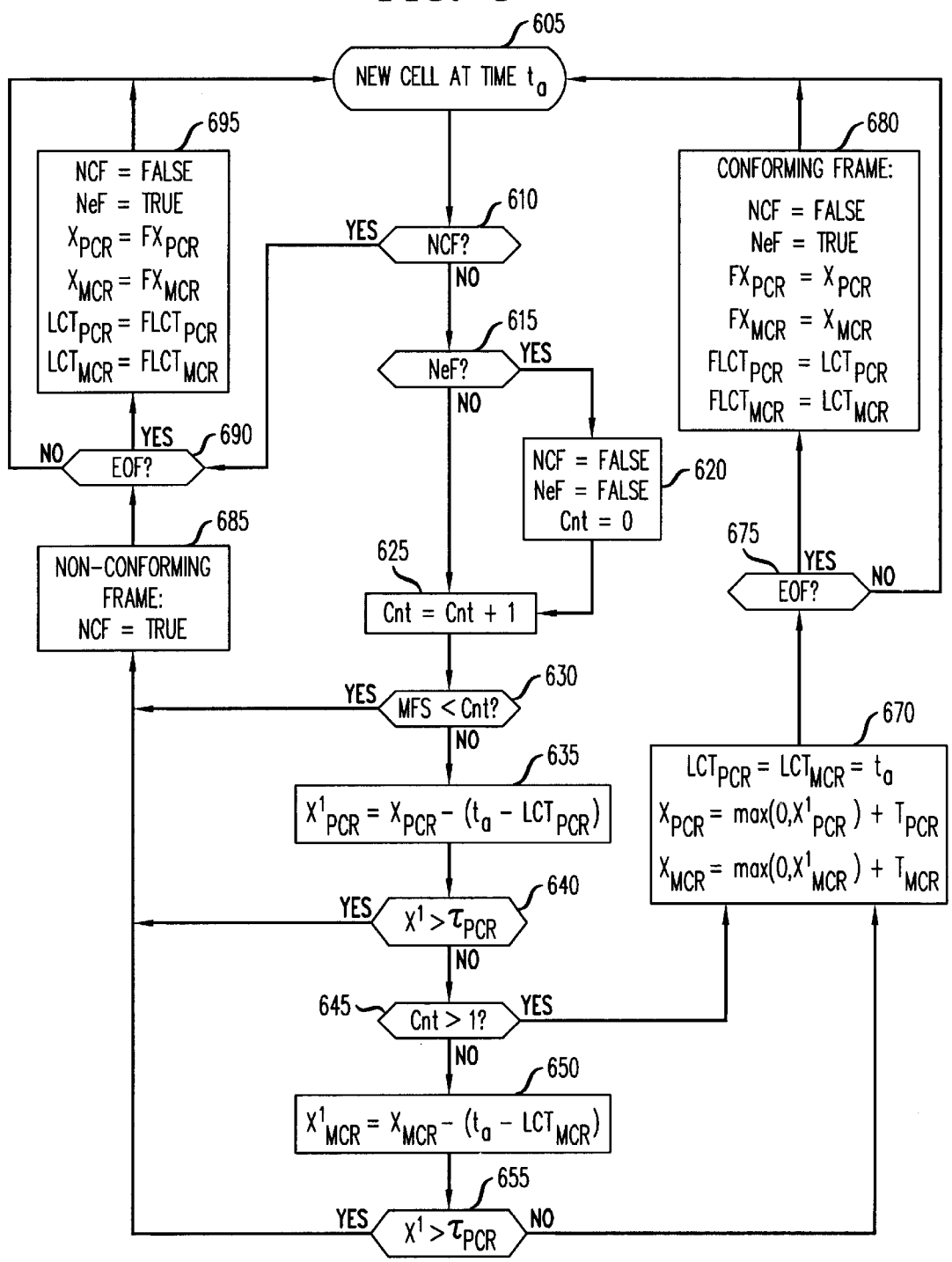
Figure 7:
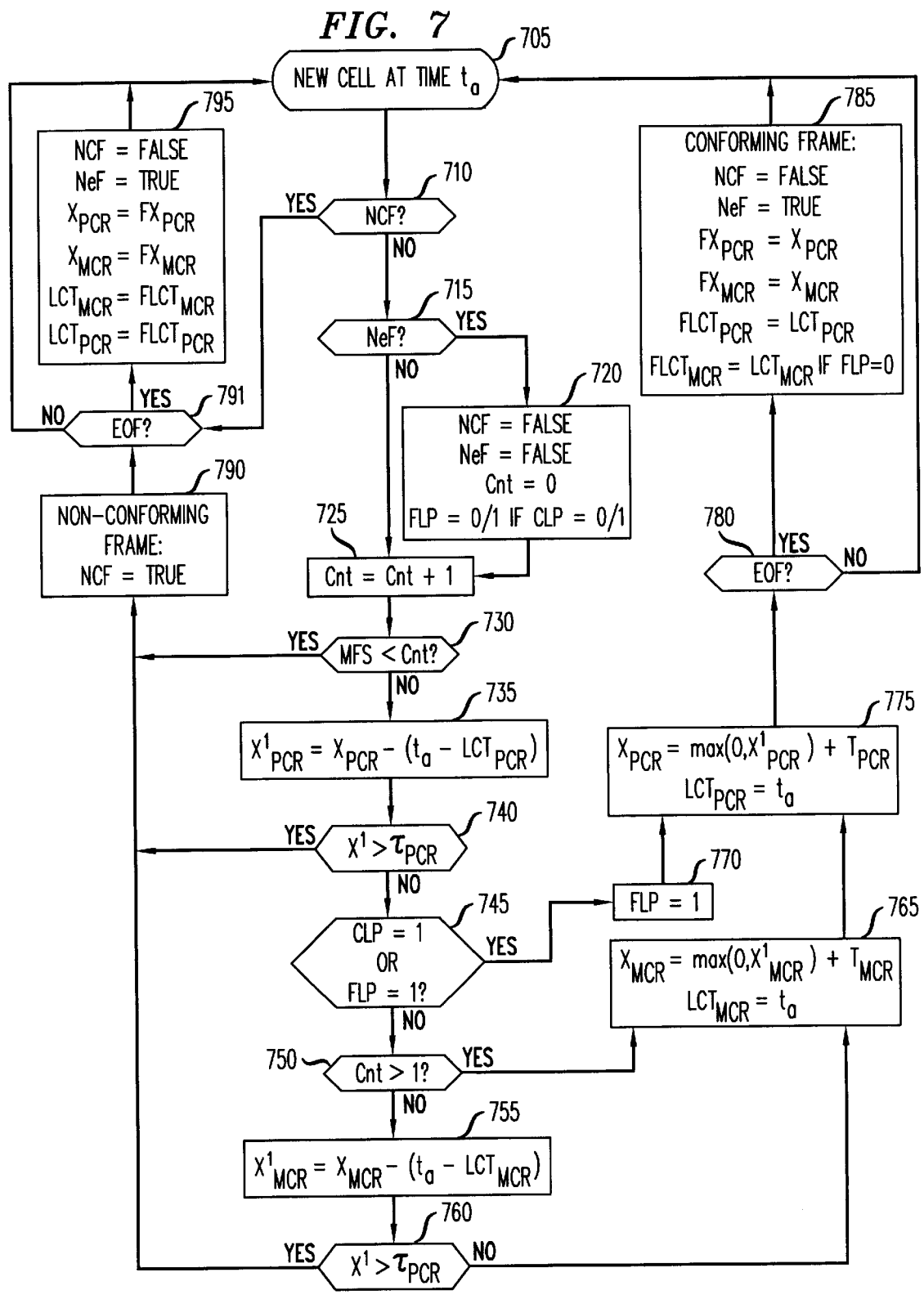
Figure 8:
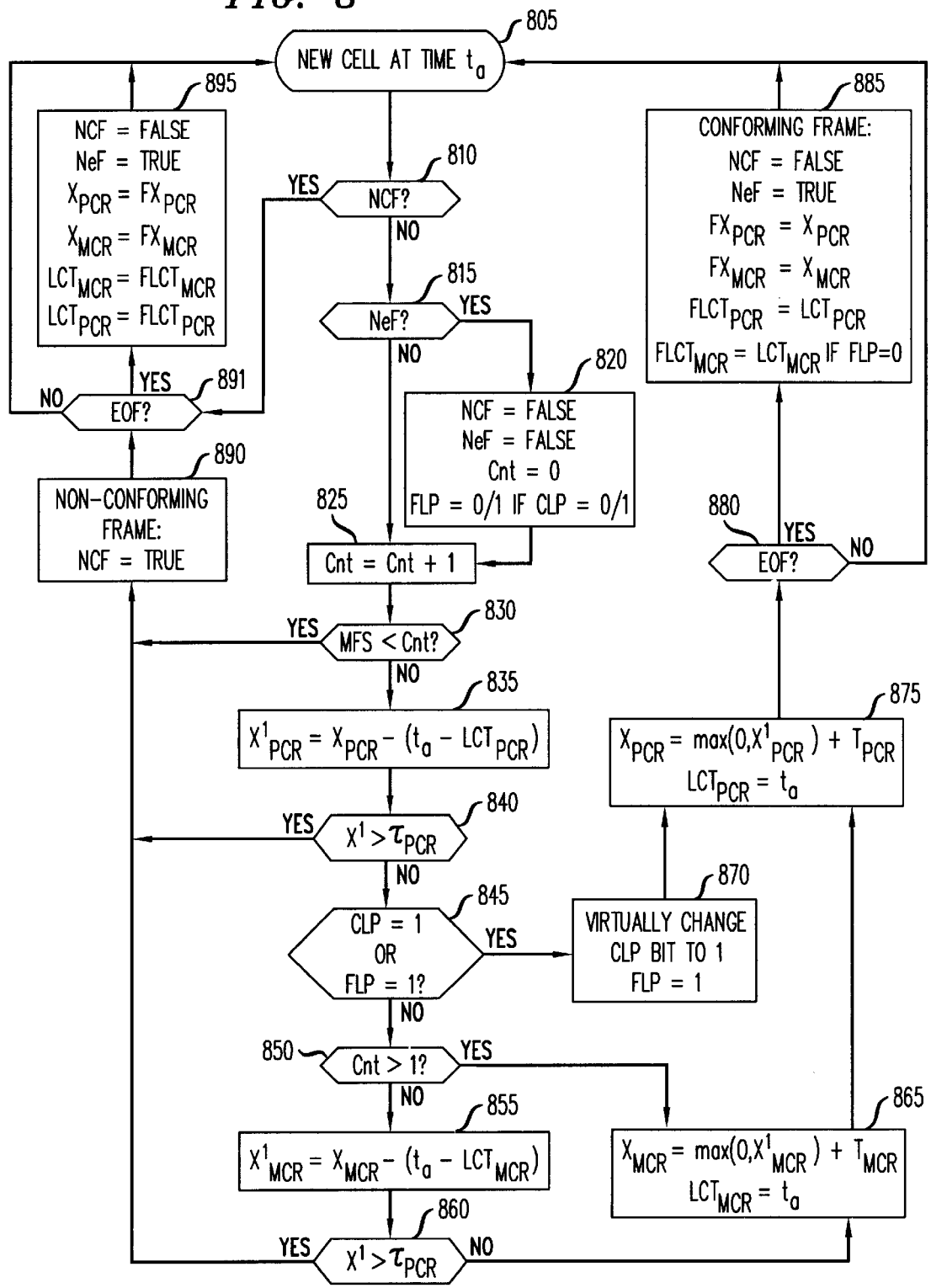

The conformance algorithms for the three versions of the GFR service are provided both in terms of a frame-based virtual-scheduling algorithm (FIGS. 3, 4, and 5, for GFR0, GFR1, and GFR2, respectively) and a frame-based continuous-stake leaky bucket, or virtual buffering algorithm (FIGS. 6, 7, and 8, for GFR0, GFR1, and GFR2, respectively).

As described further below, the virtual scheduling algorithm illustrated in FIGS. 3, 4, and 5, tracks the theoretical arrival times for relevant cell/frame events. These flow charts assume an unmarked (or FLP=0) frame is defined as having all its constituent cells unmarked and a marked/tagged framed (FLP=1) is defined as having at least one marked/tagged cell. In the traditional cell-based version of a virtual scheduling algorithm the theoretical arrival times for cells from the same frame conforming to the PCR traffic descriptor are updated in the variable ($TAT_{PCR}$). The theoretical arrival times for cells from the same frame conforming to the MBS/MCR traffic descriptor are updated in the variable ($TAT_{MCR}$). These variables are used to maintain the current status of potentially (but not yet) conforming frames. Two new variables, ($FTAT_{PCR}$) and ($FTAT_{MCR}$), are used to keep track of the valid theoretical arrival times for conforming frames. These new variables are updated only at the end of the frame, at which time cell conformance to all relevant tests for a frame is completely determined. The variables $TAT_{PCR}$, $TAT_{MCR}$, $FTAT_{PCR}$, and $FTAT_{MCR}$, are initialized with the time of arrival of the first cell of the connection, $t_a^0$.

Figure 3:
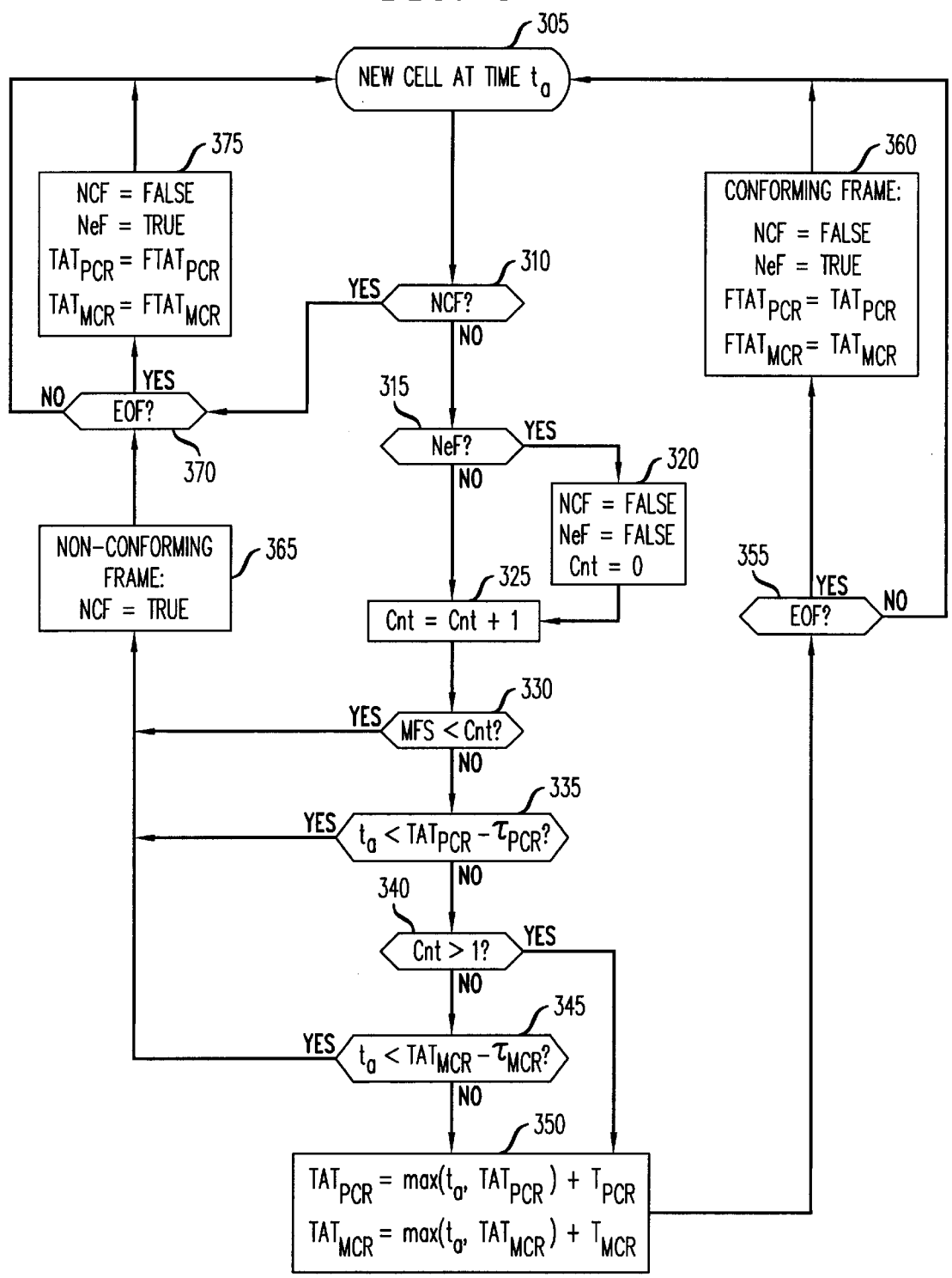
FIGS. 3–8 illustrative different flow charts for use in the network of FIG. 2.

Referring now to FIG. 3, an illustrative flow chart is shown for the GFR0 service. In step 305, a new cell from the received data stream arrives at time $t_a$. In step 310, a check is made of the value of the NCF variable. If this is a non-conforming frame, execution proceeds to step 370 (described below). If this is a conforming frame (at least for the moment), execution proceeds to step 315, which checks the value of the variable NeF. If this is a new frame, the variables NCF, NeF and Cnt are initialized as shown in step 320 and execution proceeds to step 325. If, in step 315, it is not a new frame, execution proceeds to step 325. In this latter step, the value of the Cnt variable is increased by one. In step 330, a comparison is made if the value of the Cnt variable is greater than the MFS. If the value of the Cnt variable is greater than the MFS, execution proceeds to step 365, where the frame is marked as a non-conforming frame and execution proceeds to step 370, described below. However, if the value of the Cnt variable is not greater than the MFS, execution proceeds to step 335.

In step 335, a comparison is made between the cell time and the value of the difference between theoretical arrival time for the PCR ($TAT_{PCR}$) and the cell delay variation of the PCR ($\tau_{PCR}$) (these variable were described above). If the value of the cell arrival time is less than this difference, execution proceeds to step 365, where the frame is marked as a non-conforming frame and execution proceeds to step 370, described below. If the value of the cell arrival time is not less than this difference, execution proceeds to step 340.

In step 340 a check is made if the value of Cnt is greater than 1. If the value of Cnt is greater than 1, execution proceeds to step 350, described below. If the value of Cnt is not greater than 1, execution proceeds to step 345. In the latter step, a comparison is made between the cell time and the value of the difference between theoretical arrival time for the MCR ($TAT_{MCR}$) and the cell delay variation for the MCR/MBS ($\tau_{MCR}$) (these variables were described above). If the value of the cell arrival time is less than this difference, execution proceeds to step 365, where the frame is marked as a non-conforming frame and execution proceeds to step 370, described below. If the value of the cell arrival time is not less than this difference, execution proceeds to step 350.

In step 350, the values for the variables $TAT_{PCR}$, and $TAT_{MCR}$ are updated as shown, where $\max(t_a, TAT_{PCR})$ refers to the maximum value of either $t_a$ or $TAT_{PCR}$ (similarly with respect to $\max(t_a, TAT_{MCR})$). Execution proceeds to step 355, where a check is made for the end of frame. If this is not the end of the frame, execution returns to step 305 for the next cell. If this is the end of frame, it is a conforming frame and the variables, NCF, NeF, $FTAT_{PCR}$ and $FTAT_{MCR}$ are updated as shown in step 360 and execution proceeds to step 305 for the next cell.

In step 370, a check is made of the value of EOF variable. If this is not the end of the frame, execution returns to step 305. If this is the end of the frame (which in this case is non-conforming), the variables NCF, NeF, $TAT_{PCR}$ and $TAT_{MCR}$ are updated as shown in step 375. Execution then proceeds to back to step 305 to process the next cell.

As can be observed from the method of FIG. 3, the MFS conformance test (step 350), the PCR conformance test (step 335) and the maximum burst size/minimum cell rate (MBS/MCR) conformance test (step (345) are evaluated only as a function of the current frame and prior conforming frames. In particular, if a frame is conforming, the variables are updated as shown in step 360. However, if the frame is non-conforming, the variables are set to prior values based upon prior conforming frames, in step 375.

Figure 4:
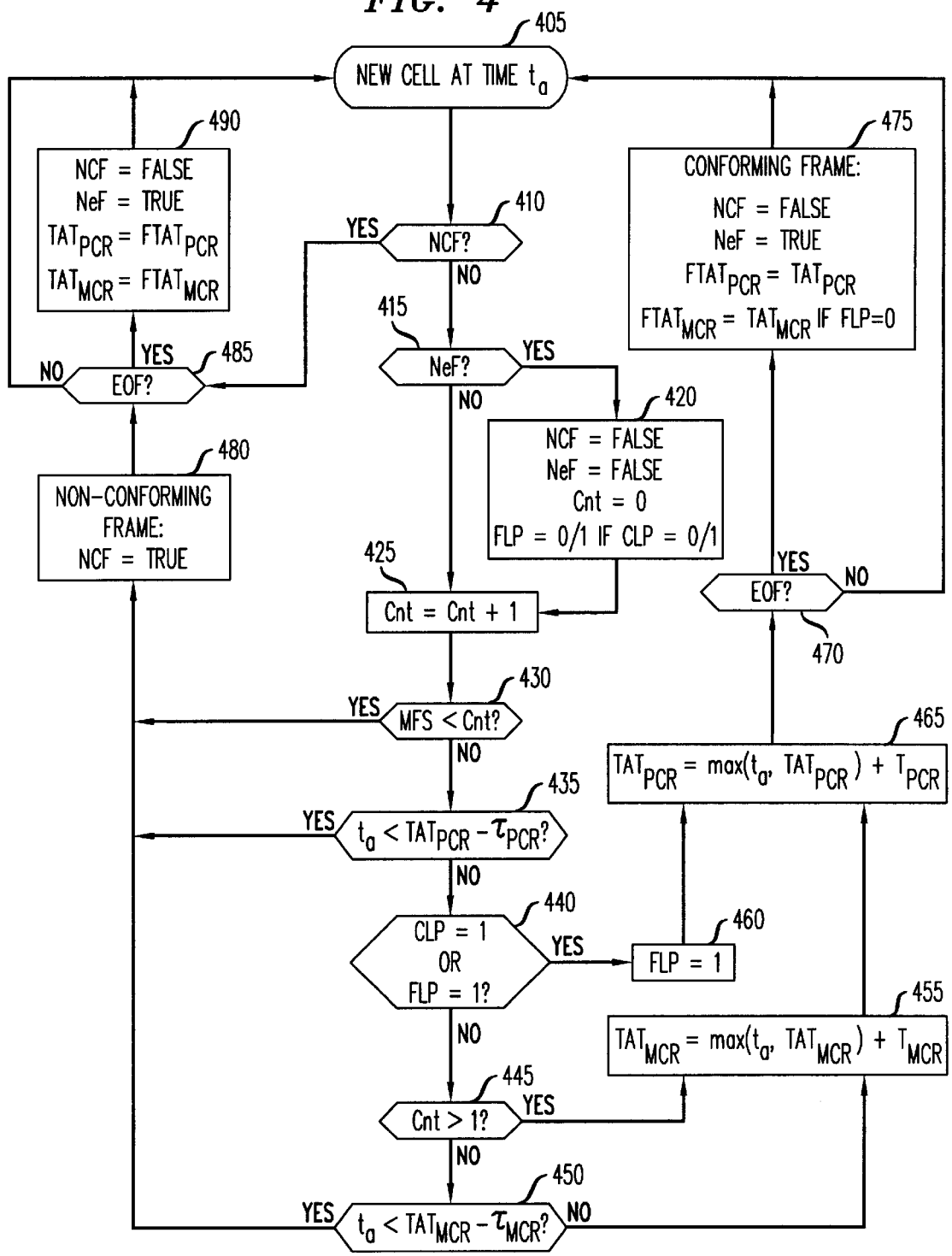

Referring now to FIG. 4, an illustrative flow chart is shown for the GFR1 service. In step 405, a new cell from the received data stream arrives at time $t_a$. In step 410, a check is made of the value of the NCF variable. If this is a non-conforming frame, execution proceeds to step 485 (described below). If this is a conforming frame (at least for the moment), execution proceeds to step 415, which checks the value of the variable NeF. If this is a new frame, the variables NCF, NeF, Cnt, and FLP are initialized as shown in step 420 and execution proceeds to step 425. If, in step 415, it is not a new frame, execution proceeds to step 425. In this latter step, the value of the Cnt variable is increased by one. In step 430, a comparison is made if the value of the Cnt variable is greater than the MFS. If the value of the Cnt variable is greater than the MFS, execution proceeds to step 480, where the frame is marked as a non-conforming frame and execution proceeds to step 485, described below. However, if the value of the Cnt variable is not greater than the MFS, execution proceeds to step 435.

In step 435, a comparison is made between the cell time and the value of the difference between theoretical arrival time for the PCR ($TAT_{PCR}$) and the cell delay variation for the PCR ($\tau_{PCR}$) (these variables were described above). If the value of the cell arrival time is less than this difference, execution proceeds to step 485, where the frame is marked as a non-conforming frame and execution proceeds to step 485, described below. If the value of the cell arrival time is not less than this difference, execution proceeds to step 440.

In step 440 a check is made if either CLP or FLP are set. If either are set, execution proceeds to step 460 where the variable FLP is set and then to step 465, described below. If neither CLP or FLP are set, execution proceeds to step 445, where a check is made if the value of Cnt is greater than 1. If the value of Cnt is greater than 1, execution proceeds to step 455, described below. If the value of Cnt is not greater than 1, execution proceeds to step 450. In the latter step, a comparison is made between the cell time and the value of the difference theoretical arrival time for the MCR ($TAT_{MCR}$) and the cell delay variation for the MCR/MBS ($\tau_{MCR}$) (these variables were described above). If the value of the cell arrival time is less than this difference, execution proceeds to step 480, where the frame is marked as a non-conforming frame and execution proceeds to step 485, described below. If the value of the cell arrival time is not less than this difference, execution proceeds to step 455, where the value for the variable $TAT_{MCR}$ is updated as shown. Execution then proceeds to step 465, where the value for the variable $TAT_{PCR}$ is updated as shown.

After step 465, execution proceeds to step 470, where a check is made for the end of frame. If this is not the end of the frame, execution returns to step 405 for the next cell. If this is the end of frame, it is a conforming frame and the variables NCF, NeF, $FTAT_{PCR}$ and $FTAT_{MCR}$ are updated as shown in step 475 and execution proceeds to step 405 for the next cell.

In step 485, a check is made of the value of the EOF variable. If this is not the end of the frame, execution returns to step 405. If this is the end of the frame (which is a non-conforming frame, the variables NCF, NeF, $TAT_{PCR}$ and $TAT_{MCR}$ are updated as shown in step 490. Execution then proceeds to back to step 405 to process the next cell.

Referring now to FIG. 5, an illustrative flow chart is shown for the GFR2 service. This flow chart is similar to the flow chart of FIG. 4 and will not be described herein. It should be noted that in step 560, the CLP bit variable is virtually changed to one, in that the actual CLP bit of the frame is not set but the CLP variable for the program is set as if the frame was marked.

Turning now to FIGS. 6, 7 and 8, a continuous-state leaky bucket approach is illustrated. These FIGs. are similar in context to the ones described above with respect to FIGS. 3 and 4, and will not be described herein except as noted. This approach tracks a theoretical buffer content at the arrival time of the relevant cell/frame events (versus the elapsed time approach of FIGS. 3, 4, and 5). These flow charts assume an unmarked (or FLP=0) frame is defined as having all unmarked cells, and a marked/tagged framed (FLP=1) is defined as having at least one marked/tagged cell. In the traditional cell-based version of a continuous-state leaky bucket algorithm the theoretical buffer content for cells from the same frame conforming to the PCR traffic descriptor are updated in the variable $X_{PCR}$, while the associated Last Conformance Time for such a cell is updated in the variable $LCT_{PCR}$. The theoretical buffer content for cells from the same frame conforming to the MCR/MBS traffic descriptors are updated in the variable $X_{MCR}$, while the associated Last Conformance Time for such a cell is updated in the variable $LCT_{MCR}$. Four new alternative variables, $FX_{PCR}$, $FLCT_{PCR}$, $FX_{MCR}$, and $FLCT_{MCR}$, are also provided. All buffer content variables are initially set to zero while all Last Conformance Time variables are initialized with the time of the arrival of the first cell of the connection $t_a^0$.

It can be observed from the flow diagrams of FIGS. 3–8 that all state variables are properly initialized with the beginning of each frame, i.e., at frame boundaries, and all state variables properly reflect the results of the conformance tests at the end of the frame. Of course, these bookkeeping operations can be as well performed at the end of the frame. As a result, if a frame is declared as non-conforming, cells from that frame are not used to determine any QoS commitments to future user generated traffic.

It should be noted that changes to the flow charts of FIGS. 3–8 for alternative definitions of marked/tagged frames are straightforward and will not be described herein. For example, if the first cell of the frame is indicative of the marked/tagged status of the frame, the additional test for the CLP status as well as the new determination of the FLP status performed after the MCR and PCR tests would be removed from FIGS. 3–8.

Frame Non-Conformance Indicator

I have observed that, notwithstanding a particular GFR service conformance definition, implemented in, e.g., an edge network element (such as ATM switch 105), there is no ability for other network elements to differentiate cells from non-conforming frames from cells in conforming frames. This aspect makes it harder for a downstream NE to fulfill its QoS commitments since these non-conforming cells are in fact in excess of the GFR traffic set and, as such, potentially consume unallocated NE resources. Therefore, and in accordance with the invention, a frame-level conformance indication code is defined for each frame. As a result, each NE is able to determine whether a frame, and its constituent cells, are conforming or non-conforming by inspecting values of the conformance indication code.

Figure 9:
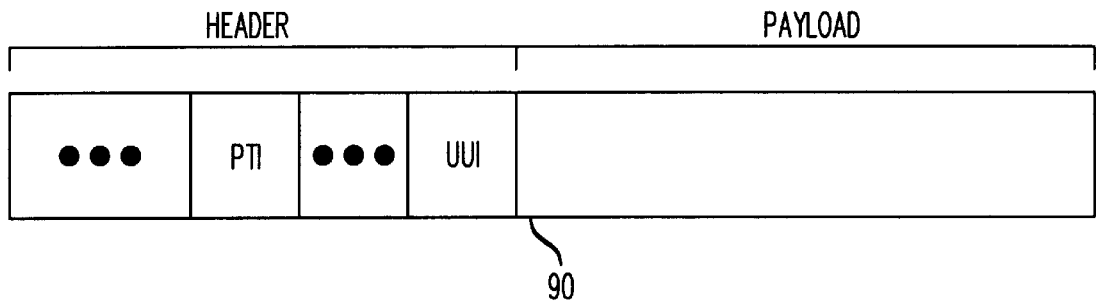
FIG. 9 shows an illustrative conformance bit indicator in accordance with the principles of the invention.

As illustrative conformance indication in accordance with the principles of the invention in FIG. 9. An ATM cell comprises fixed size cells of 53 octets. FIG. 9 shows an illustrative ATM cell 90 comprising a header portion and a payload portion as known in the art. The header portion further includes a Payload Type Indicator (PTI) field (a three bit field). In accordance with the invention, the PTI field is used to indicate whether a cell belongs to a frame that has been found to be non-conforming to a respective traffic set. In particular, if a frame is determined to be non-conforming, a NE sets the PTI field (described below), of a least the end-of-frame cell (i.e., the cell with the UUI bit set to one in AAL5), to a predefined code value representative of non-conformance (hereafter referred to as an NCF code).

Figure 10:
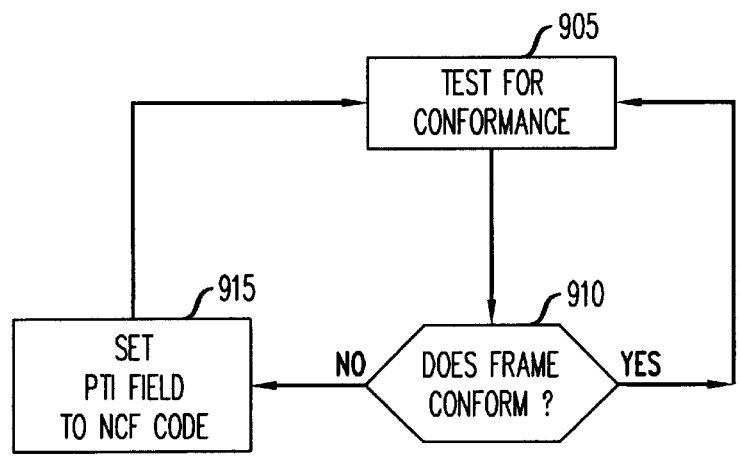
FIG. 10 shows a illustrative flow chart embodying the principles of the invention for use in the network of FIG. 1.

An illustrative method in accordance with the principles of the invention is shown in FIG. 10 for use in ATM switch 105 of FIG. 2. It is presumed that ATM switch 105 is suitably programmed to carry out the below-described method using conventional programming techniques, which, as such, will not be described herein. In step 905, a test is made for conformance, e.g., using one of the above-described conformance techniques of FIGS. 3–8. In step 910, a check is made if the frame conforms. If the frame conforms, conformance testing continues in step 905. However, as soon as the frame does not conform, the PTI field is set equal to the NCF code in step 915 and execution proceeds to step 905. With regard to setting the PTI field to the NCF code, it is convenient to set at least the PTI field in the end-of-frame cell. (As noted, the end-of-frame cell is indicated by the appropriate value of the UUI bit.)

As a result of the above, subsequent transmission of cells from a frame from switch 105 will indicate whether that frame was conforming or non-conforming. Thus, a downstream NE (i.e., other NEs (not shown) of Network 100 of FIG. 2) may now determine that cells (including the end-of-frame cell) belong to a non-conforming frame and any of the cells from that frame may be discarded from its buffer irrespective of the PTI field status of the other user data cells for that frame. In particular, one illustrative method for use in an NE for processing a stream of data is as follows. For each received cell, a check is made for the non-conforming indication code (here the value of the PTI field). If the non-conforming indication code is detected, the frame (or only selected cells from the frame) is discarded. If the non-conforming indication code is not detected, the NE processes the frame for continued transmission, e.g., performing its own conformance check (and setting of the PTI field to the NCF), and transmitting the frame to other NEs.

Other modifications to the technique shown in FIG. 10 are possible. For example, the PTI field of every cell found to be non-conforming (which would include the end-of-frame cell) can be set to the NCF code.

It should be noted that to directly accommodate the NCF code in the above-described methods of FIGS. 3–8, corresponding steps 210, 310, 410, 510, 610, 710, and 810, can be modified as follows. If either the internal NCF variable it "TRUE" or the PTI field of the cell is set to the predefined NCF code then the frame is declared as non-conforming.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of an ATM network, the inventive concept is applicable to other frame-aware services. In addition, although the inventive concept was described in the context of determining conformance in accordance with the illustrations of FIGS. 3–8, any conformance technique, even that of the prior art, can be used for determining when to set the conformance indicator bit.

What is claimed:

1. A method for use in a Guaranteed Frame Rate (GFR) service for testing for conformance, the method comprising the steps of:

receiving a stream of data, the data representative a sequence of frames, the frames comprising a number of cells;

determining if each frame conforms to a predefined traffic set; and setting at least one data field of the frame to a value representative of whether the frame includes data that conforms or not.

2. The method of claim 1 wherein the frame comprises a plurality of cells and at least one of the cells includes said data field.

3. The method of claim 2 wherein each cell is an asynchronous transmission mode (ATM) cell.

4. The method of claim 3 wherein said data field is a part of the header of at least one of the ATM cells.

5. The method of claim 4 wherein the data field is an ATM payload type indicator.

6. The method of claim 1 wherein the frame comprises a plurality of cells and the setting step includes the step of setting a data field of an end-of-frame cell.

7. The method of claim 6 wherein each cell is an ATM cell and the end-of-frame cell is indicated by an appropriate value of a user-to-user field of the ATM cell.

8. The method of claim 7 wherein the set data field is a payload indicator field of the ATM cell.

9. The method of claim 1 wherein the frame comprises a plurality of cells and the setting step includes the step of setting a data field of each cell as indicative of whether the frame conforms or not.

10. The method of claim 9 wherein each cell is an ATM cell and the set data field is a payload indicator field of the ATM cell.

11. A method for use in processing a stream of data representing a sequence of frames, the method comprising the steps of:

receiving a stream of data, the data representative a sequence of frames, the frames comprising a number of cells;

checking each frame for a non-conforming indicator code;

if the non-conforming indication code is detected, discarding the frame; and if the non-conforming indication code is not detected, processing the frame for continued transmission.

12. The method of claim 11 wherein each cell is an asynchronous transmission mode (ATM) cell and the checking step includes the step of checking a payload type indicator field of each ATM cell.

13. The method of claim 11 wherein each cell is an asynchronous transmission mode (ATM) cell and the checking step includes the steps of:

determining if a cell is an end-of-frame cell by checking a user-to-user-bit indicator; and if the cell is an end-of-frame cell, checking a payload type indicator field to determine if the frame conforms or not.

14. A method for use in processing a stream of data representing a sequence of frames, the method comprising the steps of:

receiving a stream of data, the data representative a sequence of frames, the frames comprising a number of cells;

checking each frame for a non-conforming indicator signal;

if the non-conforming indicator signal is detected, discarding non-conforming cells from the frame; and if the non-conforming indicator signal is not detected, processing the frame for continued transmission.

15. The method of claim 14 wherein each cell is an asynchronous transmission mode (ATM) cell and the checking step includes the step of checking a payload type indicator field of each ATM cell.

16. The method of claim 14 wherein each cell is an asynchronous transmission mode (ATM) cell and the checking step includes the steps of:

determining if a cell is an end-of-frame cell by checking a user-to-user-bit indicator; and if the cell is an end-of-frame cell, checking a payload type indicator field to determine if the frame conforms or not.

* * * * *